June 25, 1963  K. C. ALLEN  3,095,054
WEIGHING SCALES

Original Filed Feb. 1, 1957

INVENTOR.
KENNETH C. ALLEN
BY
*Marechal, Biebel, French & Bugg*
ATTORNEYS

June 25, 1963     K. C. ALLEN     3,095,054
WEIGHING SCALES
Original Filed Feb. 1, 1957     4 Sheets-Sheet 2
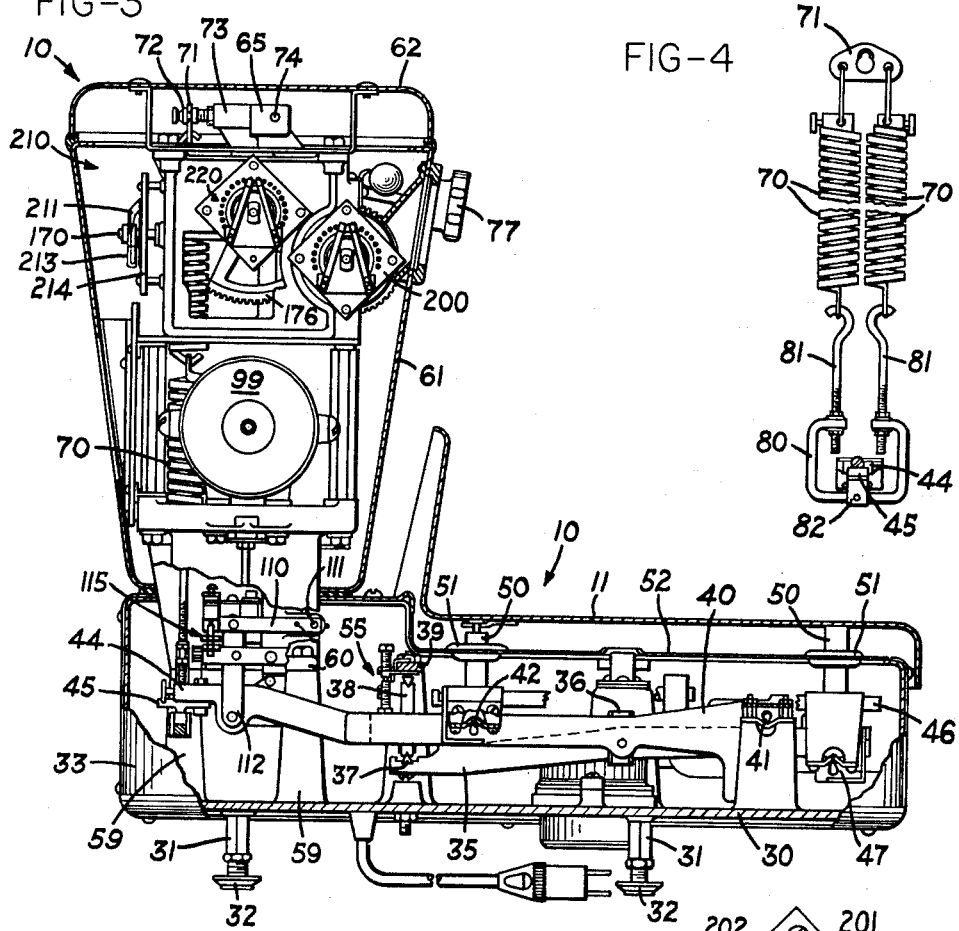
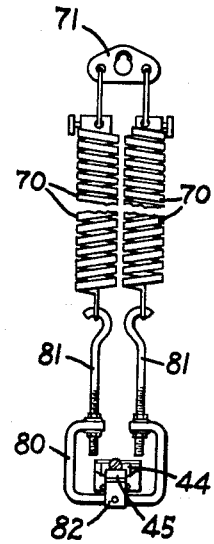
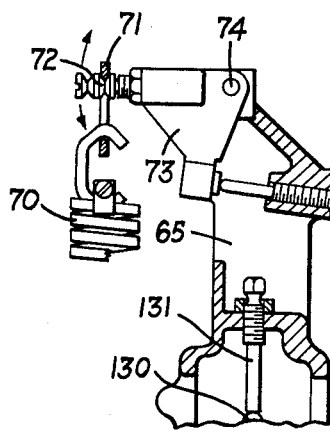
INVENTOR.
KENNETH C. ALLEN
BY
Marechal, Biebel, French & Bugg
ATTORNEYS

INVENTOR.
KENNETH C. ALLEN
BY
ATTORNEYS

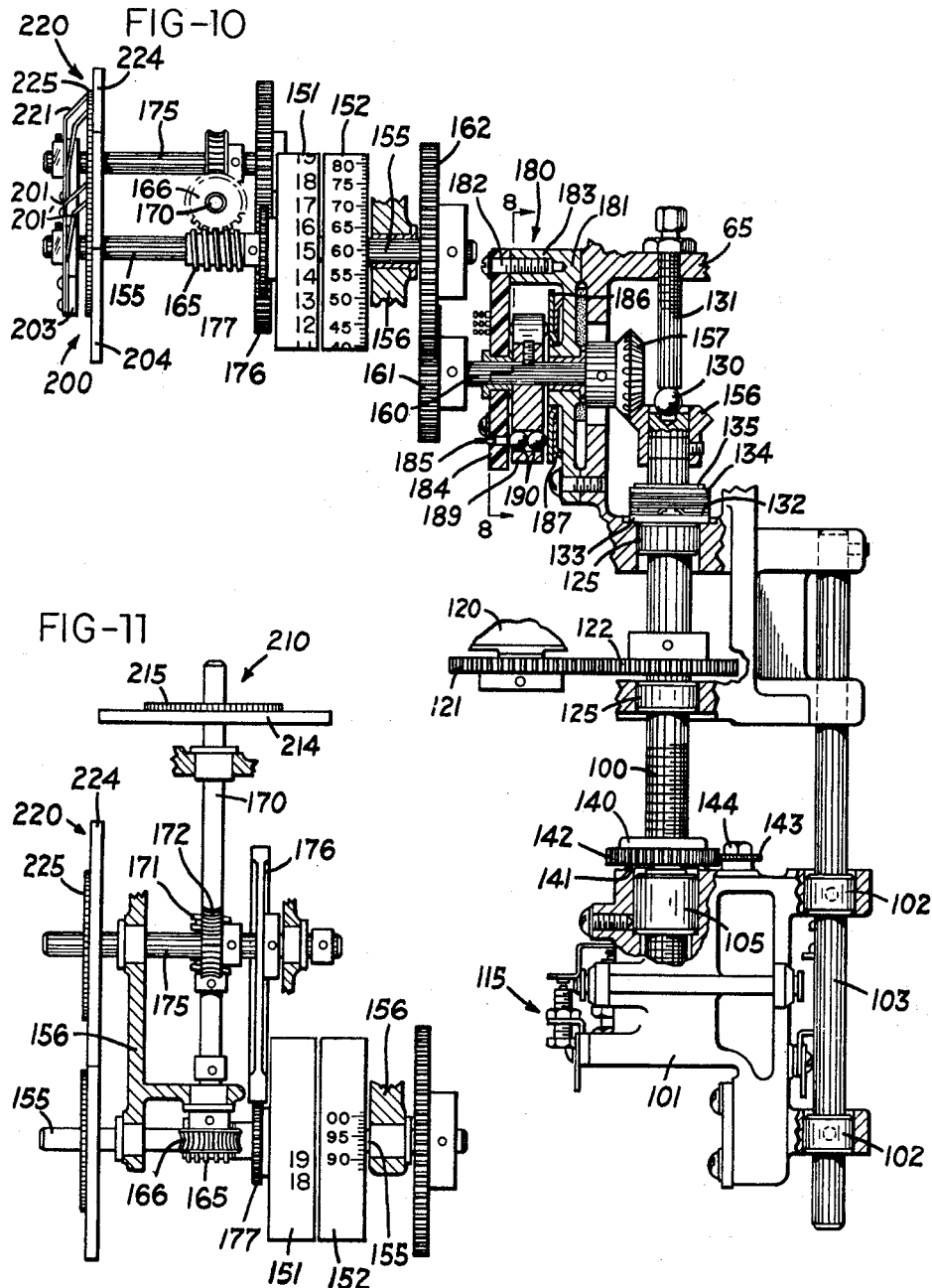

United States Patent Office 3,095,054
Patented June 25, 1963

3,095,054
WEIGHING SCALES
Kenneth C. Allen, Dayton, Ohio, assignor to The Hobart Manufacturing Company, Troy, Ohio, a corporation of Ohio
Original application Feb. 1, 1957, Ser. No. 637,725, now Patent No. 3,045,229, dated July 17, 1962. Divided and this application June 25, 1959, Ser. No. 822,836
5 Claims. (Cl. 177—3)

This invention relates to weighing scales, and more particularly to power operated weighing scales.

The invention has special relation to a power operated weighing system which includes both a powered weighing mechanism and also apparatus responsive to the operation of the weighing mechanism for computing the value of successive weighed articles and for issuing printed tickets identifying the weight, unit price and value of the articles. A system of this type is particularly useful in food stores for prepackaging operations wherein a series of successive packages or articles of food commodities are weighed and then labeled with a printed ticket identifying the commodity together with its weight, unit price and value. Such systems are disclosed in a series of copending applications identified as cases A to G inclusive in accordance with the index table at the end of this specification, all of which are assigned to the assignee of the present application, and further reference to these applications will be found hereinafter.

One of the objects of the present invention is to provide a power operated scale which is of simple and rugged structure, which will operate at high speed with great accuracy, and especially which is constructed to minimize the development of stresses or strains capable of adversely affecting the speed or accuracy thereof even after extended use.

The invention has particular application to a power operated scale wherein an electric motor drives a lead screw to effect movement of a follow up mechanism in proportion to the displacement of the associated weighing mechanism under load, and one of the objects of the invention is to provide such a scale which is especially constructed to maintain the lead screw in axially fixed relation with the support for the counterbalancing spring of the scale such that any deflection capable of affecting either the lead screw or the spring will equally affect the other and thereby will be prevented from affecting the overall accuracy of the scale.

Another object of the invention is to provide a power operated scale of the type outlined above which incorporates a special construction for minimizing backlash between the lead screw and the follow up mechanism, and an additional object of the invention is to provide such a scale wherein special provision is made for protecting the lead screw from the heat generated by operation of the scale motor.

Other objects and advantages of the invention will be apparent from the following description, the accompanying drawings and the appended claims.

In the drawings—

FIG. 3 is a view of the scale of FIG. 1 looking from left to right in FIG. 1 and with the casing and some of the parts broken away in vertical section;

FIG. 4 is a fragmentary view looking from left to right in FIG. 3 to show the balancing springs and their mounting means;

FIG. 5 is an enlarged fragment of FIG. 3 showing the tare adjustment and additional details of the spring mounting;

FIG. 6 is an enlarged and partially broken fragment of FIG. 3 showing the face of one of the read-out switches;

FIG. 10 is a fragmentary view looking in the same direction as FIG. 7 and showing details of the power operated weighing mechanism and also certain of the read-out switches; and FIG. 11 is a fragmentary view looking downwardly on FIG. 10 to illustrate further details of the drive to the several read-out switches.

Figure 1:
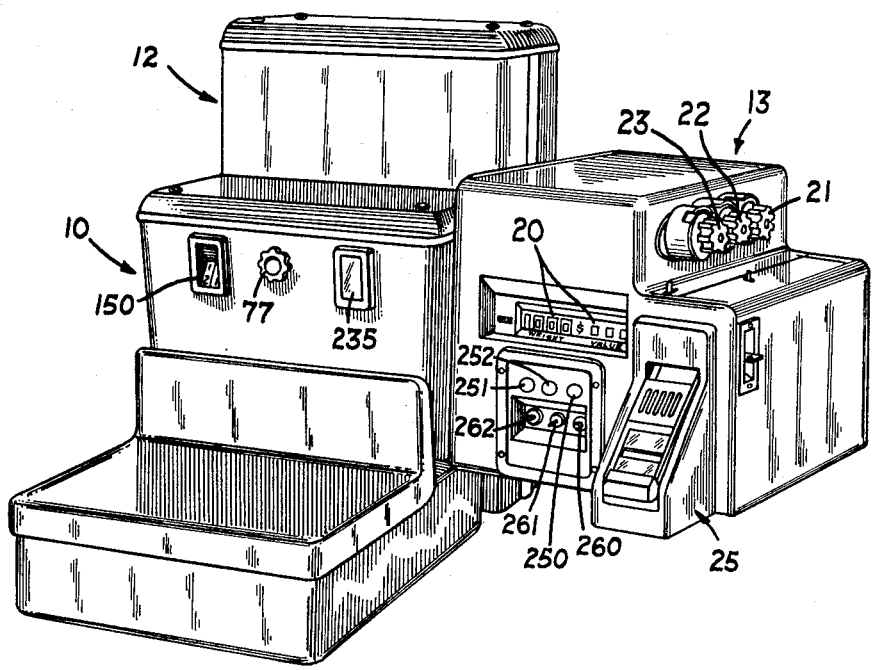
FIG. 1 is a perspective view showing a complete power operated weighing system constructed in accordance with the invention and including a power operated scale, apparatus actuated by the scale for computing the value of the weighed load, and a register for printing and issuing printed tickets identifying the weighed commodity with its weight, unit price and value.

Referring to the drawings, which illustrate preferred embodiments of the invention, the complete weighing system of FIG. 1 includes a power operated scale indicated generally at 10 and including a platter 11 which receives the package or other article to be weighed. The scale 10 is described in detail hereinafter, and copending Case A also discloses a power operated mechanism suitable for use in the scale of the invention. The weighing operation of the weighing mechanism of scale 10 is transmitted to a computing apparatus represented generally in FIG. 1 by the housing 12 which registers the total weight in terms of pounds and suitable fractions of a pound, and which also computes the value of the load in accordance with a pre-set price per pound as described in greater detail hereinafter, and an example of a suitable such computer is also disclosed in detail in copending Case B.

Figure 2:
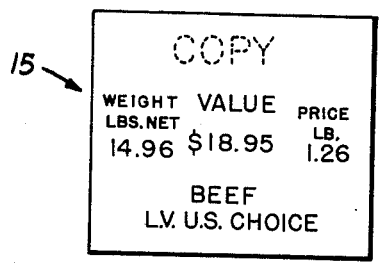
FIG. 2 illustrates a printed ticket of the type issued by the apparatus of FIG. 1.

The scale 10 and computer 12 are in turn interconnected with a register-printer indicated generally at 13 which is constructed for cooperation with the scale and computer to print and issue successive printed tickets showing the weight and the unit price and value of each load weighed by the scale. A suitable such register-printer is disclosed in detail in copending Case C. An example of a ticket produced by the printer 13 is shown at 15 in FIG. 2, and the register-printer also is provided with visual indicator wheels 20 showing the weight and computed value of each load.

The register-printer 13 is provided with manual control knobs 21, 22 and 23 which corresponds to dollars, dimes and cents per pound and are mounted on the outside of the printer casing for pre-setting the unit price of the commodity being weighed, all as described in Case C. In addition, the register-printer is shown as incorporating a mechanism indicated generally at 25 which functions to receive each successive ticket issued by the printer and to deliver such ticket to the operator in a manner offering maximum aid in achieving speed and accuracy in the application of such tickets to the successive weighed packages. Such ticket handling mechanism or labeler is disclosed in detail in copending Case D.

Figure 7:
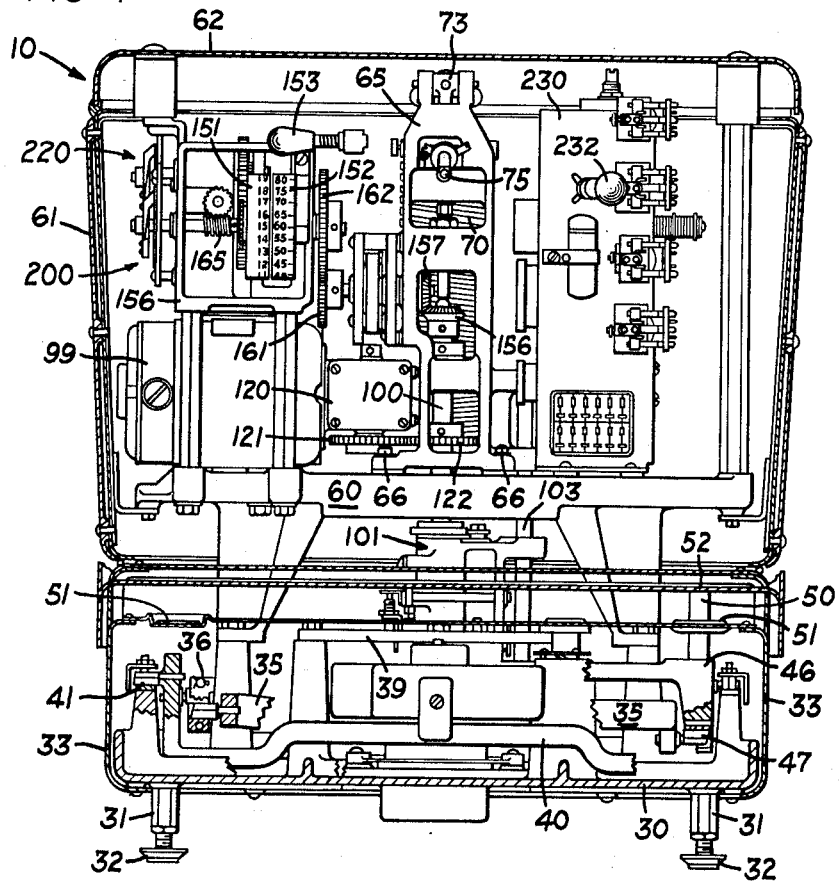
FIG. 7 is a view of the front of the scale of FIG. 1 with the casing and some other parts broken away in generally vertical section.

The structure of the scale 10 is illustrated in detail in FIGS. 3–11. Referring particularly to FIGS. 3 and 7, the scale includes a base 30 made of a ribbed casing which includes leg portions 31 within which the adjustable feet 32 are received to provide for leveling the base upon its support. This base and the weighing mechanism in the main portion thereof are enclosed by a housing 33 and are shown as of substantially the construction disclosed in Meeker et al. Patent No. 2,649,293 issued August 8, 1953, to the assignee of this application.

The weighing mechanism is shown somewhat fragmentarily as of the double lever type, with the two levers being interfitted with each other. The inner lever 35 is pivoted on floating links 36 carried at intermediate points on the outer lever 40, and its rearward end is fulcrumed by engagement of a pivot 37 thereon with a bearing recess in the lower end of a strut 38 having a similar bearing recess at its upper end which receives a downwardly projecting portion of a strut support bar 39 secured at its opposite ends upon portions of the base casting 30. The outer lever 40 is pivoted on fulcrum bearings 41 which are fixed to the base 30 as shown, and it includes rearwardly extending arm portions on which are secured pivots 42 which form supports for the rearward end of the platter. At its rearward end, the outer lever 40 includes a rearwardly extending arm portion 44 which carries the nose iron 45 at its outer end.

A generally rectangular frame 46 for receiving the platter 11 is supported on the pivots 42 and on similar pivots 47 carried by the forward portion of the inner lever 35. The platter is directly supported by posts 50 which extend upwardly from the corners of the frame 46 through seals 51 in a housing plate 52 which cooperates with the casing 33 to seal the interior of the weighing mechanism. FIG. 3 also shows the switch 55 carried by the strut bar 39 and the inner lever 40 which controls the No Load relay as described in Case A and is closed only when there is less than a predetermined minimum load on the platter such, for example, as one-quarter pound.

The base 30 includes boss portions 59 at the back thereof on which is rigidly secured a sub-base 60 which supports the counterbalancing system, the weight indicating mechanism, and its associated drive, all of which are enclosed by a lower panel assembly 61 and a top cover 62. The main supporting member within this upper housing is the spring support column 65, which is rigidly secured to the sub-base 60 by means of the bolts 66. At the upper end of the column 65 is an adjustable support assembly for the pair of counterbalancing springs 70, which includes a hanger 71 pivoted at 72 on an arm 73 which is in turn pivoted at 74 in the upper end of the column 65. The tare adjusting shaft 75 is threaded as shown in FIG. 5 through the front of column 65 for adjustable engagement with the lower end of the arm 73, and the shaft 75 extends outwardly through the lower housing 61 and carries the knob 77 by which this tare adjustment may be effected and controlled.

A generally U-shaped bracket 80 is connected with the lower ends of the springs 70 by hooks 81. The bracket 80 extends around the rearward end of the lever 40, and it includes a suitable bearing 82 engaging the nose iron 45 for transmitting the weighing movements of the lever to the springs 70. Power operated means are provided for sensing the position of the lever 40 during such weighing movements and for transmitting the proper information with respect to the balanced position of the lever to the computer and the register-printer, and these means are in some respects similar to the apparatus disclosed in Cases A and E.

The sensing mechanism operates in conjunction with a reversible electric motor 99 mounted on the subbase 60 and connected as described hereinafter to drive a lead screw 100 depending from the column 65. A carriage 101 is mounted by bearings 102 for accurately guided vertical movement on a rod 103 which also depends from the column 65, and a nut 105 is mounted within the carriage 101 as shown in FIG. 10 and provides a threaded driving connection with the lead screw 100 causing vertical movement of the carriage in response to rotation of the lead screw. The carriage 101 carries sensing means for causing and controlling the driving action of the motor 99 in response to weighing movements of the lever 40 and to the extent necessary to maintain the carriage 101 in predetermined relation with the lever 40.

Referring particularly to FIG. 3, a U-shaped arm 110 is pivotally mounted on carriage 101 at 111 and is connected by a link 112 with the end portion 44 of lever 40. This arm 110 corresponds to the part 85 in Case E and functions to operate a sensing switch mechanism indicated generally at 115 which as described in Case E controls the forward and reverse energizing circuits for the motor 99. More specifically, whenever the lever 40 moves downwardly under the weight of a load on the platter 10, the motor 99 is energized to drive lead screw 100 in the direction to lower carriage 101 until the neutral position of arm 110 or the carriage is re-established, and vice versa when the lever 40 moves upwardly after the load is removed from the platter. As described in Case F and as shown in FIG. 12 thereof, the mechanism 115 includes a switch arm 116 having a ground contact 117 which closes both of relays C and R when the scale is in balance, moves down to drop out both of these relays when the scale is moving away from zero under load, and moves upwardly to open only relay C when the scale is moving toward zero.

Special provision is made for protecting lead screw 100 against adverse effects of operating conditions such as heat and backlash and for maintaining it in accurately parallel relation with the slide rod 103 on which the carriage 101 is mounted. As shown in FIG. 7, the motor 99 is mounted at one side of the sub-base 60 in spaced relation with the centrally mounted lead screw 100, and the driving connection from the motor to the lead screw includes a gear reduction 120 driving a spur gear 121 in mesh with a spur gear 122 secured directly on the lead screw. Thus the gear reduction and gears 121 and 122 provide insulation against the transfer of heat from the motor to the lead screw even during prolonged use of the scale.

As best seen in FIG. 10, the lead screw 100 is mounted in spaced web portions of the column 65 by means of radial bearings 125 to provide support against sidewise thrust on the lead screw. It is also important for maintained high accuracy of operation that maximum assurance be provided against the possibility of shifts in the relative axial positions of the lead screw and the fixed upper ends of the springs 70. Thus if the lead screw and springs are supported by different structural members, or even at widely spaced locations in the same member, deflections occurring in the supporting structure, as from thermal expansion or mechanical stresses, are likely to produce relative axial displacement of the lead screw and springs, and such displacement by even such small amount as a few ten-thousandths of an inch may seriously affect the accuracy of the scale.

The present invention provides a construction establishing maintained relative positions of the leads screw and springs irrespective of deflections which may occur in the supporting structure under service conditions. Referring to FIG. 10, a firm reference point for the upper end of the lead screw 100 in the column 65 is established by a ball 130 carried in a recess in the upper end of the lead screw as best seen in FIG. 10 and engaging an adjustable stud 131 threaded in an upper portion of column 65. The ball 130 is maintained in thrust engagement with the lead screw and with stud 131 by a spring loading washer 132 positioned between a shoulder on the column 65 and a thrust washer 133 which in turn is held in fixed position on the lead screw by a collar 134 and retaining ring 135. This construction, as best shown in FIG. 5, establishes the reference point for the lead screw in the same structural part as the support for the upper ends of springs 70 and very close to the springs. Furthermore, not only is this structure at a location such that the chances for deflections to develop are very slight, but any such deflections would affect the lead screw and springs effectively equally and would therefore not affect the overall accuracy of the scale.

Special provision is made by the invention for minimizing backlash between the lead screw 100 and carriage 101, and the mechanism for this purpose is also best seen in FIG. 10. It includes an adjusting nut 140 threaded on the lead screw in compressing relation with a spring loading washer 141 against the upper surface of the carriage 101. The nut 140 is formed or otherwise provided with external gear teeth 142 meshing with a gear 143 mounted on the top of the carriage 101 by a bolt 144, and after nut 140 has been threaded into the desired tightened relation on the lead screw with respect to the carriage and washer 141, it is locked in that position through gear 143 by tightening the bolt 144. The provision of the gears 142 and 143 makes it possible to lock nut 140 axially with respect to nut 105 without affecting the action of the spring washer 141, and when the washer 141 is thus established in spring loading relation with both nut 140 and the drive nut 105 within the carriage, backlash between nut 105 and the threads on the lead screw is effectively prevented.

Means are provided for reading out the angular position of the lead screw 100 during each weighing operation of the scale, and particularly for translating and digitalizing this information for use in the computer and register-printer to produce a record of the weight and value of each weighed load. A direct visual indication of the weight is produced at 150 on the front of the scale by means of a pair of dials 151 and 152 representing pounds and hundredths of pounds respectively, and constantly illuminated during use of the scale by a light 153. The dial 152 is secured on a shaft 155 which is supported in a frame 156 mounted on the sub-base 60. The shaft 155 is driven directly from the lead screw 100 by a pair of miter gears 156 and 157 of 1:1 ratio, a shaft 160 and a pair of spur gears 161 and 162 of selected ratio such that the shaft 155 makes a single complete revolution for each angular movement of the lead screw equal to one pound.

The dial 151 is free on shaft 155 and is driven at a substantially slower rate than the dial 152 depending upon the total range in pounds of the scale. This range is shown as having its maximum at 24.99 pounds, and the dial 151 may therefore be driven at a ratio of 1:25 with respect to dial 152. This drive includes a worm 165 on shaft 155 which drives a worm gear 166 on a shaft 170 at a reduction of 10 to 1, and a worm 171 on shaft 170 drives a worm gear 172 on a shaft 175 also at a reduction of 10 to 1. Since therefore the shaft 175 will normally rotate only through a range of about 90°, a segment 176 on shaft 175 drives a gear 177 secured to the dial 151 at an increase of 1 to 4 to provide the desired 1:25 ratio of dial 151 to dial 152.

Figure 8:
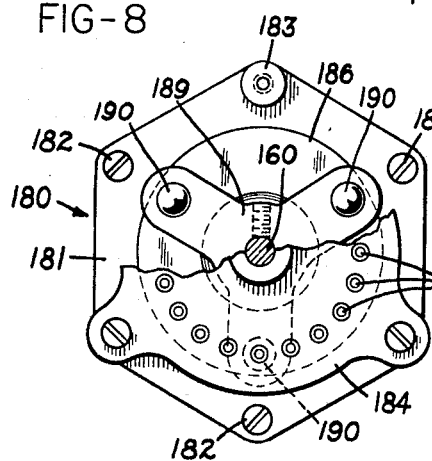
FIG. 8 is an enlarged fragmentary view taken generally on the line 8—8 of FIG. 10 with portions broken away and illustrating the read-out switch for hundredths of pounds.
Figure 9:
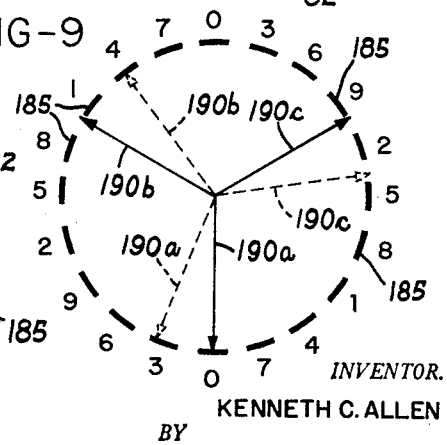
FIG. 9 is a diagrammatic view illustrating the operation of the switch of FIG. 8.

The shaft 160 also drives a novel electric switch indicated generally at 180 for reading out the angular position of the lead screw 100 and transmitting such information to the computer and printer. Referring particularly to FIGS. 8–10, the shaft 160 is journaled in a frame and bearing assembly 181 mounted on the column 65 by screws 182. The assembly 181 includes three axially projecting bosses 183 on which is mounted a switch contact plate 184 having a plurality of contacts 185 circularly arranged thereon. Opposite the contact plate 184 on the inside of assembly 181 is a metal plate 186 and spring loading washer 187 in grounded engagement with assembly 181, and the rotary member of this switch is a ball retainer 189 secured on shaft 160 and carrying three pairs of steel balls 190 arranged for engagement between the contacts 185 and the grounded plate 186.

The purpose of the switch 180 is to provide for reading out the angular position of the lead screw 100 in small increments, in order to read out the weight in hundredths of a pound. The arrangement of three pairs of balls in the retainer 189 provides structural advantages of maximum stability in the switch, and the contact plate 184 is shown as having a total of 20 contacts 185, which provide for practical spacing in a switch of convenient size for a multiple of 10 contacts which is not divisible by 3 and is therefore suitable with a decimal system. In other words, this arrangement provides a total of 60 impulses for each revolution of shaft 160 and requires only 1⅔ revolutions of the lead screw 100 and the shaft 160 for each pound, and the gears 161 and 162 should therefore provide a reduction of 5 to 3 between shaft 160 and shaft 155. If it is desired to measure weight in other than a decimal system, as for example in pounds and ounces, the arrangement of contacts and the gearing may readily be modified accordingly.

FIG. 9 illustrates diagrammatically the wiring and operation of switch 180. The three arrows 190a–190c represent three pairs of balls 190, and the arrow 190a is shown in centered engagement with a contact 185 marked "0." The arrow 190b is just short of a "1" contact 185, and the arrow 190c is approached but at a greater distance from a "2" contact. In this position of the switch 180, the figure "0" will be transmitted to the computer and printer for the hundredths column of weight.

FIG. 9 illustrates in dotted lines another position of the ball carrier 189 in which the arrow 190a has moved almost out of engagement with a "3" contact. In this position of the switch, the arrow 190b is also engaged with a "4" contact, while the arrow 190c is approaching but not yet in engagement with a "5" contact. This position of the switch would cause the digit "4" to appear in the hundredths column of the computer and printer, and so forth, it being understood that each pair of like numbered contacts is wired together. It is also desirable that the relative size and spacing of the contacts 185 be such that at all times at least one contact will be in engagement with a ball, and the circuits are such as described hereinafter that when two balls engage different contacts, the higher number of each such bridged contacts will be read out.

Three other read out switches are provided for the tenths of pounds, pounds, and tens of pounds respectively. The tenths of pounds switch is identified generally as 200 and is shown in detail in FIG. 6. It includes a pair of wipers 201 and 202, referred to as leading and trailing wipers respectively, mounted on a rotor 203 which is secured on the shaft 155 and is therefore driven as already described at the same speed as the dial 152 to provide for one revolution thereof for each pound of weight measured by the lead screw 100. The wipers 201 and 202 cooperate with a contact plate 204 having a circular row of contacts 205 thereon, and since this is the tenths of pounds switch, there should be ten operative contacts. This is accomplished with a simple construction in the device as shown through use of the contact plate 204 having 30 contacts 205 thereon which are wired together in pairs and with adjacent such pairs separated by an unconnected contact.

The wipers 201 and 202 are so fixed on the rotor 203 that they can engage adjacent contacts 205, but since every third contact is dead, there is no possibility of the bridging of live contacts by a single wiper nor of the engagement of different pairs of live contacts by the same wiper. This makes practical the use of a standard switch plate of convenient size and shape, but obviously printed circuits and other equivalent arrangements of contacts could be used.

In order to provide separate circuits for each of the wipers 201 and 202, the contact plate 204 also carries a pair of concentric slip rings 206 and 207 inside the row of contacts 205 which are connected selectively to ground as described hereinafter in connection with the wiring diagram. The wiper 201 includes a supplemental wiper arm 201′ which is continually in engagement with the slip ring 206, and the wiper 202 includes a similar supplemental arm 202′ in continuous engagement with the ring 207. The electric operation of this switch is described in detail hereinafter in connection with the wiring diagram.

The switch 210 for reading out pounds is shown as identical with the switch 200 and includes wipers 211 and 212 on a rotor 213 secured to the shaft 170 and cooperating with a contact plate 214 provided with multiple contacts 215 arranged and connected in pairs in the same manner as the contacts 205, and the rotor 213 therefore rotates at a ratio of 1:10 with respect to the rotor 203. The switch 220 for tens of pounds is also shown as of identical construction incorporating wipers 221 and 222 on a rotor 223 which is secured on shaft 175 and therefore rotates at a ratio of 1:10 with respect to the shaft 170 through a limited range of approximately 90° as previously noted. This means that the contact plate 224 requires only enough contacts 225 for values of "0," "1" and "2" in the tens column of weight, but for convenience of production, the contact plate 224 may be identical with the plates 203 and 213 as shown except that only the necessary limited number of pairs of its contacts are connected in the wiring system, and the "9" contact is also used for the purpose of indicating when the scale is below zero, as explained in Case F.

At the opposite side of the sub-base 60 from the frame 156 is a mount 230 which supports the several relays controlling operation of the scale. The mount 230 also supports a signal light 232 which is energized in coordinated relation with the operation of the scale and computer to signal to the operator the progress of the weighing operation, and which is visible through the window 235 in the front of the scale housing. This light is out while the scale is weighing, but as soon as the weighing is completed and the computer has started its operations, the light 232 comes on to indicate that the load can now be removed from the platter and replaced by a new load.

There are additional signal lights and also several manual switches on the register-printer which will now be identified, although they are all also described in Case C. The light 250 is the Error light corresponding to light 585 in Case C which is energized in the event of improper operation of the computer or printer, too great a weight on the platter for the capacity of the scale, a below zero position of the platter. The light 251 is the Change Price light which is energized if the price selecting knobs 21–23 are inaccurately set or are not changed following changing in the weighing of one commodity to another as described in connection with the corresponding light 500 in Case C. The light 252 is a warning light signaling approaching exhaustion of the supply of paper on which the successive tickets are printed and it corresponds to light 395 in Case C.

Again referring to FIG. 1, the manual switch 260 is the Reset switch effective to correct for errors occurring in the operation of the scale as described in connection with switch 600 in Case C. The manual switch 261 is the Repeat switch causing the printer to issue a plurality of identical labels for packages of a fixed weight. The manual switch 262 corresponds to switch 620 in Case C and is the starting switch used primarily to initiate manual operation of the complete printing cycle for test purposes or when the load is too light to actuate the No Load switch 55.

This application is a division of Case F, which contains a complete description of the sequence of operation of the entire system in connection with an illustrative wiring diagram.

While the forms of apparatus herein described constitute preferred embodiments of the invention, it is to be understood that the invention is not limited to these precise forms of apparatus, and that changes may be made therein without departing from the scope of the invention which is defined in the appended claims.

*Index Table of Copending Applications and Patents*

| Case | Inventor | Serial No. | Filing Date | Patent No. |
|---|---|---|---|---|
| A | Kenneth C. Allen | 376,136 | 8-24-53 | 2,948,523 |
| B | do | 436,218 | 6-11-54 | 2,948,464 |
| C | do | 548,148 | 11-21-55 | 2,948,465 |
| D | Allen and Meeker | 561,336 | 1-25-56 | 2,948,466 |
| E | Kenneth C. Allen | 569,448 | 3-5-56 | 2,873,416 |
| F | do | 637,725 | 2-1-57 | 3,045,229 |
| G | do | 637,756 | 2-1-57 | 2,921,780 |

What is claimed is:

1. In a power operated scale having a weighing mechanism including a lever supported on a base for displacement upon application of a load to the scale and having also a drive motor and a sensing mechanism connected with said lever for sensing the position thereof, the combination of a generally vertically-extending combined lead screw and counterbalancing spring support column having a lower end secured to said base, counterbalancing spring means connected at an upper end thereof to said column in spaced relation to said base and at the other end thereof to said lever for tensioning in response to displacement of said lever, a generally vertically-extending lead screw having a driving connection with said motor for rotation controlled by said sensing mechanism in proportion to the displacement of said lever, means supporting said sensing mechanism in driving relation with said lead screw for movement with respect to said lever in response to rotation of said lead screw, bearing means on said column, engaging and establishing a single reference point for the upper end of said lead screw in closely spaced relation with the connection of said upper end of said spring means on said column, and spring bias means urging said upper end of said lead screw into engagement with said reference point to prevent relative movement of said upper end of said lead screw and said upper end of said spring means.

2. In a power operated scale having a weighing mechanism including a lever supported on a base for vertical displacement upon application of a load to the scale and having also a drive motor and a sensing mechanism connected with said lever for sensing the position thereof, the combination of a vertically-extending combined lead screw and counterbalancing spring support column secured to said base and extending upwardly therefrom, counterbalancing spring means connected at the upper end thereof to the upper end portion of said column and at the lower end thereof to said lever for tensioning in response to displacement of said lever, a lead screw supported in said column and having a driving connection with said motor for rotation controlled by said sensing mechanism in proportion to the displacement of said lever, means supporting said sensing mechanism in driven relation with said lead screw for movement with respect to said lever in response to rotation of said lead screw, thrust bearing means fixed to said upper end portion of said column for engaging and establishing a reference point for the upper end of said lead screw in said upper end portion of said column in closely spaced relation with said upper end of said spring means, and compression spring means connected between said lead screw and said column to maintain said lead screw with the upper end thereof engaged with said bearing means at said reference point to prevent relative movement of said upper ends of said lead screw and said spring means.

3. In a power operated scale having a weighing mechanism including a lever supported on a base for vertical displacement upon application of a load to the scale and having also a drive motor and a sensing mechanism including a carriage connected with said lever for sensing the position thereof, the combination of a supporting column secured to said base, counterbalancing spring means connected at one end thereof to said column and at the other end thereof to said lever for tensioning in response to displacement of said lever, a lead screw having a driving connection with said motor for rotation controlled by said sensing mechanism in proportion to the displacement of said lever, means including a driving nut carried by said sensing mechanism carriage in driven relation with said lead screw for causing movement of said carriage with respect to said lever in response to rotation of said lead screw, a second nut threaded on said lead screw adjacent said carriage, means on said carriage adjustably securing said second nut in fixed angular relation to said driving nut, compression spring means located in compressed relation between said carriage and said second nut to prevent backlash of said driving nut with respect to said lead screw with the force of said spring on said driving nut being variable by operation of said adjustable means, bearing means engaging and establishing a reference point for one end of said lead screw on a portion of said column in closely spaced relation with said one end of said spring means, and means for maintaining said one end of said lead screw in contact with said bearing means at said reference point to prevent relative movement of said one end of said lead screw and said one end of said spring means.

4. In a power operated scale having a weighing mechanism including a lever supported on a base for vertical displacement upon application of a load to the scale and having also a drive motor and a sensing mechanism including a carriage connected with said lever for sensing the position thereof, the combination of a supporting column secured to said base, counterbalancing spring means connected at one end thereof to said column and at the other end thereof to said lever for tensioning in response to displacement of said lever, a lead screw having a driving connection with said motor for rotation controlled by said sensing mechanism in proportion to the displacement of said lever, means including a driving nut carried by said sensing mechanism carriage in driven relation with said lead screw for causing movement of said carriage with respect to said lever in response to rotation of said lead screw, a second nut threaded on said lead screw adjacent said carriage, compression spring means located in compressed relation between said carriage and said second nut to prevent backlash of said driving nut with respect to said lead screw, gear teeth on said second nut, a gear mounted for rotation on said carriage in mesh with said gear teeth on said nut for rotation thereby during tightening of said second nut against said compression spring means, and means for securing said gear against rotation to lock said second nut in said tightened relation with said compression spring means.

5. In a power operated scale having a weighing mechanism including a lever supported on a base for vertical displacement upon application of a load to the scale and having also a drive motor and a sensing mechanism including a carriage connected with said lever for sensing the position thereof, the combination of a vertically-extending combined lead screw and counterbalancing spring support column secured to said base and extending upwardly therefrom, counterbalancing spring means connected at the upper end thereof to the upper end portion of said column and at the lower end thereof to said lever for tensioning in response to displacement of said lever, a lead screw supported in said column and having a driving connection with said carriage causing vertical movement of said carriage in response to rotation of said lead screw, means securing said motor with relation to said base, a gear reduction unit connected with said motor and having a power shaft extending therefrom, meshing gears on said power shaft and said lead screw cooperating with said gear reduction unit to provide a driving connection from said motor to said lead screw with said reduction unit located physically between said lead screw and said motor for insulation of said lead screw from heat developed in use by said motor and said reduction unit, said sensing mechanism including control means for said motor causing said motor to drive said lead screw in proportion to the vertical displacement of said lever, thrust bearing means on said upper end portion of said column forming a reference point for the upper end of said lead screw, and spring bias means for maintaining said lead screw with the upper end thereof engaged with said thrust bearing means and fixed against movement with relation to said upper end of said counterbalancing spring means.

References Cited in the file of this patent

UNITED STATES PATENTS

| | | |
|---|---|---|
| 1,874,491 | Fritschi | Aug. 30, 1932 |
| 2,040,071 | Brendel | May 12, 1936 |
| 2,040,073 | Brendel | May 12, 1936 |
| 2,311,264 | Stimpson | Feb. 16, 1943 |
| 2,407,341 | Meyer | Sept. 10, 1946 |
| 2,713,208 | Bizzoco | July 19, 1955 |
| 2,982,145 | Orner | May 2, 1961 |